(12) United States Patent
Huang et al.

(10) Patent No.: US 7,133,535 B2
(45) Date of Patent: Nov. 7, 2006

(54) SYSTEM AND METHOD FOR REAL TIME LIP SYNCHRONIZATION

(75) Inventors: Ying Huang, Beijing (CN); Stephen Ssu-te Lin, Beijing (CN); Baining Guo, Beijing (CN); Heung-Yeung Shum, Bejing (CN)

(73) Assignee: Microsoft Corp., Redmond, WA (US)

( * ) Notice: Subject to any disclaimer, the term of this patent is extended or adjusted under 35 U.S.C. 154(b) by 724 days.

(21) Appl. No.: 10/328,215

(22) Filed: Dec. 21, 2002

(65) Prior Publication Data

US 2004/0120554 A1  Jun. 24, 2004

(51) Int. Cl.
*G06K 9/00* (2006.01)
*G10L 215/00* (2006.01)

(52) U.S. Cl. ............... 382/100; 382/118; 704/235; 704/256; 704/258; 704/260; 704/270

(58) Field of Classification Search ............... 382/100; 704/235, 256, 258, 260, 270
See application file for complete search history.

(56) References Cited

U.S. PATENT DOCUMENTS

| | | | |
|---|---|---|---|
| 5,880,788 A * | 3/1999 | Bregler | 348/515 |
| 5,907,351 A * | 5/1999 | Chen et al. | 348/14.12 |
| 5,933,151 A * | 8/1999 | Jayant et al. | 345/473 |
| 6,366,885 B1 * | 4/2002 | Basu et al. | 704/270 |
| 6,449,595 B1 * | 9/2002 | Arslan et al. | 704/235 |
| 6,735,566 B1 * | 5/2004 | Brand | 704/256 |
| 6,813,607 B1 * | 11/2004 | Faruquie et al. | 704/276 |
| 6,919,892 B1 * | 7/2005 | Cheiky et al. | 345/473 |
| 2002/0007276 A1 * | 1/2002 | Rosenblatt et al. | 704/260 |
| 2002/0152074 A1 * | 10/2002 | Junqua | 704/260 |
| 2004/0122675 A1 * | 6/2004 | Nefian et al. | 704/276 |

OTHER PUBLICATIONS

Kakihara et al. "Speech-to-Face Movement Synthesis Based on HMMS", Aug. 2, 2000, 2000 IEEE International Conference on Multimedia And Expo, 2000, ICME 2000, vol. 1, pp. 427-430.*

Huang et al. "Real-Time Lip-Synch Face Animation Driven by Human Voice", Dec. 9, 1998, 1998 IEEE Second Workshops on Multimedia Signal Processing, pp. 352-357.*

Nakamura et al. "Speech-to-Lip Movements Synthesis Maximizing Audio-Visual Joint Probability Based on EM Algorithm", Dec. 9, 1998, 1998 IEEE Second Workshops on Multimedia Signal Processing, pp. 53-58.*

Masuko et al. "Text-to-Visual Speech Synthesis Based on Parameter Generation from HMM", May 15, 1998, Proceedings of the 1998 IEEE International Conference on Acoustic, Speech, and Signal Processing, 1998 ICASSP '98, vol. 6, pp. 3745-3748.*

(Continued)

*Primary Examiner*—Jingge Wu
*Assistant Examiner*—Aaron Carter
(74) *Attorney, Agent, or Firm*—Lyon&Harr, LLP; Katrina A. Lyon

(57) ABSTRACT

A novel method for synchronizing the lips of a sketched face to an input voice. The lip synchronization system and method approach is to use training video as much as possible when the input voice is similar to the training voice sequences. Initially, face sequences are clustered from video segments, then by making use of sub-sequence Hidden Markov Models, a correlation between speech signals and face shape sequences is built. From this re-use of video, the discontinuity between two consecutive output faces is decreased and accurate and realistic synthesized animations are obtained. The lip synchronization system and method can synthesize faces from input audio in real-time without noticeable delay. Since acoustic feature data calculated from audio is directly used to drive the system without considering its phonemic representation, the method can adapt to any kind of voice, language or sound.

26 Claims, 8 Drawing Sheets

OTHER PUBLICATIONS

Jones et al. "Automated Lip Synchronisation for Human-Computer Interaction and Special Effect Animation", Jun. 6, 1997, IEEE International Conference on Multimedia Computing and Systems, pp. 589-596.*

Curinga, "Use of Statistical Model for Lip Synthesis", Sep. 10, 1998, 1998 IEEE International Conference on Electronics, Circuits and Systems, vol. 3, pp. 539-541.*

Brooke et al. "Computer Graphics Animations of Talking Faces Based on Stochastic Models", 1994 International Symposium on Speech, Image Processing and Neural Networks, 1994, Proceedings, ISSIPNN '94, vol. 1, pp. 73-76.*

Choi et al. "Baum-Welch Hidden Markov Model Inversion for Reliable Audio-to-Visual Conversion", 1999 IEEE 3rd Workshop on Multimedia Signal Processing, pp. 175-180.*

Williams et al. "An HMM-Based Speech-to-Video Synthesizer", Jul. 2002, IEEE Transactions on Neural Networks, vol. 13, Issue 4, pp. 900-915.*

Brand, M., Voice puppetry, *Proc. ACM SIGGRAPH'99*, 1999.

Bregler, C., M. Covell, and M. Slaney, Video rewrite: Driving visual speech with audio, *Proc. ACM SIGGRAPH '97*, 1997.

Chang, E., J. Zhou, S. Di, C. Huang, and K. Lee, Large vocabulary Mandarin speech recognition with difference approaches in modeling tones, *International Conference on Spoken Language Processing*, Beijing, Oct. 16-20, 2000.

Covell, M., and C. Bregler, Eigenpoints, *Proc. Int. Conf. Image Processing*, Lausanne, Switzerland, Col. 3, pp. 471-474, 1996.

Curinga, S., R. Pockaj, F. Vignoli, C. Braccini, and F. Lavagetto, Application of synthetic lip motion to hybrid video coding, *Int. Workshop on Synthetic Natural Hybrid Coding and 3D Imaging (IWSNHC3DI'97)*, Sep. 5-9, 1997, Rodhes, pp. 187-191.

Curinga, S., F. Lavagetto, and F. Vignoli, Lip movement synthesis using time delay neural networks, *Proc. EUSIPCO'96*, 1996.

Davis, S. B. and P. Mermelstein, Comparison of parametric representations for monosyllabic word recognition in continuously spoken sentences, *IEEE Transactions on Acoustics, Speech and Signal Processing*, Aug. 1980, ASSP-28:57-366.

Goff, B. Le, T. Guiard-Marigny, M Cohen, and C. Benoit, Real-time analysis-synthesis and intelligibility of talking faces, $2^{nd}$ *International Conference on Speech Synthesis*, Newark (NY), Sep. 1994.

Huang, Fu Jie and Tsuhan Chen, Real-time lip-synch face animation driven by human voice, *IEEE Multimedia Signal Processing Workshop*, Los Angeles, California, 1998.

Kshirsagar, S. and N. Magnenat-Thalmann, Lip synchronization using linear predictive analysis, *Proceedings of the IEEE International Conference on Multimedia and Expo*, New York, Aug. 2000.

Lavagetto, F., Converting speech into lip movements: a multimedia telephone for hard of hearing people, *IEEE Transactions in Rehabilitation Engineering*, vol. 3, No. 1, 1995, pp. 90-102.

Morishima, S., and H. Harashima, A media conversion from speech to facial image for intelligent man-machine interface, *IEEE Journal on Selected Area in Communications*, 9(4), 1991.

Picone, J., Signal modeling techniques in speech recognition, *Proceedings of the IEEE*, 1993.

Rabiner, L., A tutorial on hidden Markov models and selected applications on speech recognition, *Proceedings of the IEEE*, 1989, 77(2):255-286.

Rabiner, L. R., J. G. Wilpon, and F. K. Soong, High performance connected digit recognition using hidden markov models, *IEEE Transactions on Acoustics, Speech and Signal Processing*, vol. 37, No. 8, Aug. 1989.

Rao, R., and T. Chen, Using HMM's for audio-to-visual conversion, *IEEE'97 Workshop on Multimedia Signal Processing*, 1997.

Yamamoto, E., S. Nakamura and K. Shikano, Lip movement synthesis from speech based on hidden Markov models, *Proc. Int. Conf. on Automatic Face and Gesture Recognition*, FG '98, Nara, Japan, 1998, IEEE Computer Society, pp. 154-159.

* cited by examiner

SYSTEM AND METHOD FOR REAL TIME LIP SYNCHRONIZATION

BACKGROUND

1. Technical Field

This invention is directed toward a system and method for lip synchronization. More specifically, this invention is directed towards a system and method for generating a sequence of images or video of a speaker's lip movements to correlate with an audio signal of a voice using Hidden Markov Models.

2. Background Art

Movement of the lips and chin during speech is an important component of facial animation. Although the acoustic and visual information of different speakers have vastly different characteristics, they are not completely independent since lip movements must be synchronized to speech. Using voice as the input, lip synchronization synthesizes lip movements to correlate with speech signals. This technique can be used in many applications such as videophone, live broadcast, long-distance education, and movie dubbing.

In the last ten years, much work has been done in the area of face synthesis and lip synchronization. Techniques based on the methods of Vector Quantification (VQ) [1], Neural Networks [2,3,4], Hidden Markov Models (HMMs) [5,6,7] and Linear Predictive Analysis [8] have been proposed to map speech to lip movements. Most of the systems are based on a phonemic representation (phoneme or viseme). For example, Video Rewrite [9] re-orders existing video frames based on recognized phonemes. Since different people speak in different tones, considerable information will be lost in a phoneme-based approach. Moreover, the phonemic representation for different languages is also different. Brand introduces a method of generating full facial animation directly from audio signals, which is based on HMMs [6]. Although this method has achieved reasonable results, its animation is rudimentary because of its use of a mean face configuration with only 26 learned states.

Restricted by algorithm efficiency, all the aforementioned systems cannot support real-time face synthesis. Recently, several methods have been proposed towards this end. Goff et al. described the first prototype of the analysis-synthesis of a speaking face running in near real-time [10]. Goff used five anatomical parameters to animate the lip model adapted to speech with a 200 ms delay between audio and video. Huang and Chen implemented a near real-time audio-to-visual mapping algorithm that maps the audio parameter set to the visual parameter set using a Gaussian Mixture Model and a Hidden Markov Model [11], but no delay data was mentioned. Morishima presented a near real-time voice-driven talking head with a 64 ms delay [12] between audio and video. He converted the LPC Cepstrum parameters into mouth shape parameters by a neural network trained by vocal features. A primary reason for the delays in these previous near real-time algorithms is that future video frames need to be processed to ensure reasonable accuracy in synthesis. This precludes these methods from being used for actual real-time lip synthesis.

It is noted that in the preceding paragraphs, as well as in the remainder of this specification, the description refers to various individual publications identified by a numeric designator contained within a pair of brackets. For example, such a reference may be identified by reciting, "reference [1]" or simply "[1]". A listing of the publications corresponding to each designator can be found at the end of the Detailed Description section.

SUMMARY

The present invention is directed toward a system and process that overcomes the aforementioned limitations in systems and methods for lip synchronization and synthesis.

The present lip synchronization system and method is designed for what is effectively real-time execution with highly continuous video. However, it can also be run in a non-real time mode with even more accuracy. The lip synchronization system and method generally comprises two phases—a training phase in which Hidden Markov Models (HMMs) are trained, and a synthesis phase wherein the trained HMMs are used to generate lip motions for a given audio input.

In general, in the training phase, sequences of a training video having a synchronized speech track are processed. Specifically, first a training video is input into the system, and processed by a signal processing module. The signal processing module operates on the video and audio data of the training video to quantize or digitize it. With the quantized vocal and facial data obtained from the training video, face states and face sequences are created. Then HMMs corresponding to the face states and face sequences are trained. The resulting trained face state HMMs and face sequence HMMs are then ready to be used for face/lip synthesis.

In the synthesis phase, the lip synchronization system and method of the invention computes vocal data via acoustic analysis from the input audio and exports face shapes synthesized by the combination of face state and face sequence HMMs.

In one working embodiment of the lip synchronization system and method, in the output phase, a contour image of a head as the background is prepared, deleting the eyes, nose, lips and chin. Eye action is modeled as independent eye blinking and eyeball movement. Finally, the lip movements are added to the eyes and facial contour and exported as a combined image.

The system and method according to the present invention circumvents the aforementioned problems of non-real time performance and delay times between audio and synthesized video through the use of video sequences. When acoustic data is determined to correspond to a given video sequence, strong future information is available to promote synthesis accuracy. That is, future lip motions that correspond to the given audio are known and can be used to produce more accurate synthesis results without the need for smoothing. Additionally, there are no discontinuities between consecutive faces in training videos, so this characteristic is capitalized upon by re-using video as much as possible when the input voice is similar to voice sequences used in training. A map from the audio signals to short sequences of the training video is built using Hidden Markov Models. If the number of short sequences is more than 100, the animation can be composed of hundreds of different face configurations, and therefore most details of lip and chin movements during speech can be shown in the synthesized result using the system and method according to the invention. Although this lip synchronization system and method can be run in an effective real-time mode, it can also be run in a non-real time mode with greater accuracy.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 Exemplary Operating Environment

Figure 1:
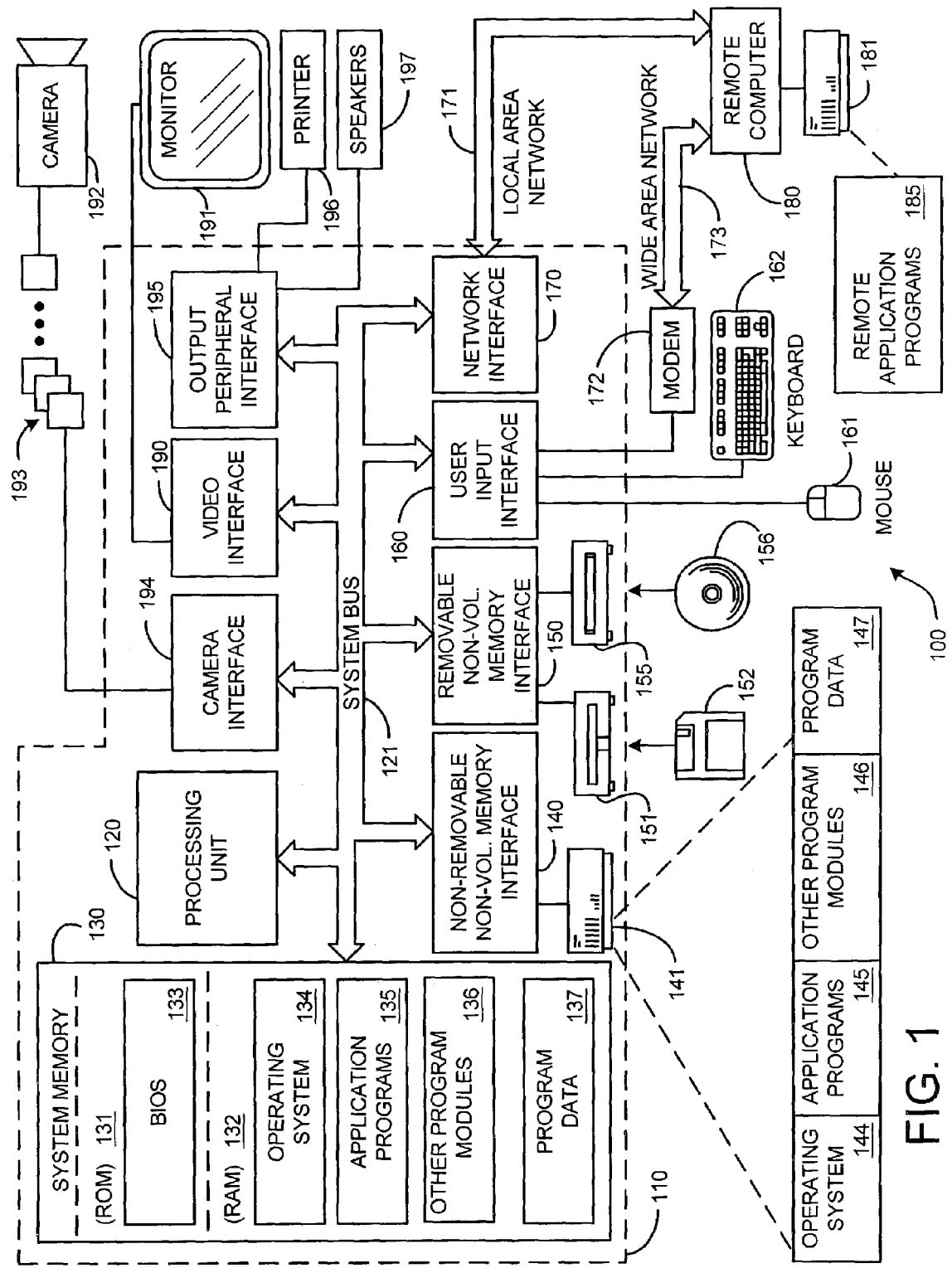
FIG. 1 is a diagram depicting a general purpose computing device constituting an exemplary system for implementing the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through anon-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as an input device to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

2.0 Lip Synchronization System and Method.

2.1 System Overview.

The lip synchronization system and method generally comprises two phases—a training phase in which Hidden Markov Models are trained, and a synthesis phase wherein the trained HMMs are used to generate lip motions from a given audio input.

By way of background, Hidden Markov models (HMMs) are a well-developed technology for classification of multivariate data that have been used extensively in speech recognition. HMMs consist of states, possible transitions between states (and the probability of those transitions being taken) and a probability that in a particular state, a particular observation is made. An observation can be anything of interest. HMMs are termed hidden because the state of the HMM cannot, in general, be known by looking at the observations. They are Markov in the sense that the probability of observing an output depends only on the current state and not on previous states. By looking at the observations, using an algorithm known as the Viterbi Algorithm, an estimate of the probability that a particular instance or stream observed was generated by that HMM can be computed. In general, HMMs model multivariate streams by representing each frame as an observation. The probability of a particular frame is estimated by using a Gaussian mixture over the channels. The Baum-Welch reestimation algorithm provides a way for the probabilities of both transitions and of observations within states to be estimated from training data.

Figure 2A:
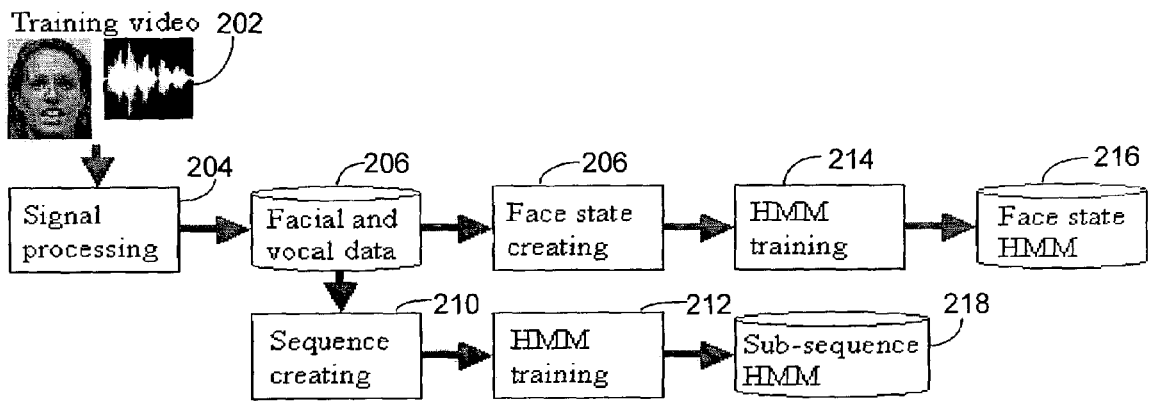
FIG. 2A is a diagram depicting the training phase of the invention.

In general, in the training phase of the lip synchronization system and method, sequences of the training video including synchronized speech are prepared. More particularly, as shown in FIG. 2A, a training video 202 comprising synchronized video and audio is input into the system, and processed by a signal processing module 204. The signal processing module 204 operates on the video and audio data to quantize or digitize it. With the quantized vocal and facial data obtained from the training video, face states 208 and face sequences 210 are created. The corresponding HMMs 214, 212 are then trained. The resulting trained face state HMMs 216 and face sequence HMMs 218, are then ready to be used for face/lip synthesis.

Figure 2B:
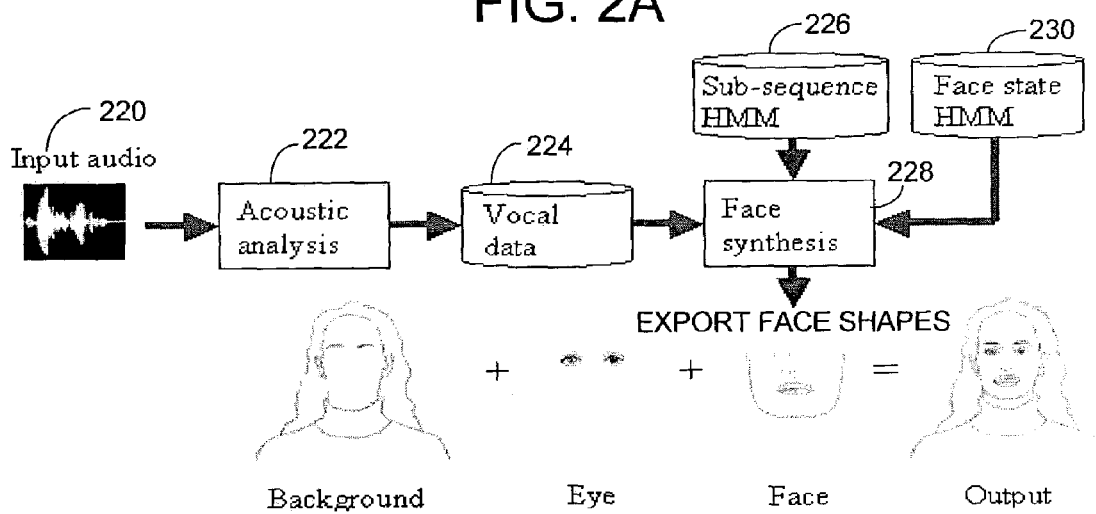
FIG. 2B is a diagram depicting the synthesis phase of the invention.

In the synthesis phase, shown in FIG. 2B, the present lip synchronization system and method computes vocal data 224 via acoustic analysis 222 from input audio 220 and exports face shapes synthesized by the combination of face state HMMs 230 and face sequence HMMs 226. In one working embodiment of the lip synchronization system and method, in the output phase, a contour image of a head is used as a background with the eyes, nose, lips and chin deleted. With the assumption that eye movement is independent of lip movement while speaking, eye action is modeled as independent eye blinking and eyeball movement. Finally, the synthesized lips, including the nose and chin, are added to the eyes and facial contour and exported as a combined image.

Compared to [1–8], the present lip synchronization system and method obtains more accurate and realistic animation when run in non-realtime. Since acoustic feature data calculated from audio is directly used to drive the lip synchronization system and method, unlike [9] the lip synchronization system and method of the present invention can adapt to any kind of voice. In particular, words pronounced by different people in different languages can drive the system satisfactorily. The output is a sequence of face shapes that can be used to drive 2D, 3D, or image-based talking heads. By adjusting some parameters, the lip synchronization system and method can be used in the application of real-time face synthesis, where each face can be synthesized within the time interval between two consecutive frames (e.g., 40 ms for 25 Hz animation). Although the performance of this real-time system is slightly lower than that of the non-real-time system, the results are nevertheless satisfactory. Compared to [10–12], the system and method of the invention can synthesize more realistic animations, has higher efficiency, exhibits no delay between audio and video, and adapts better to different kinds of voices. With this approach, it is not only possible to synthesize faces from input audio in real-time, but also to obtain accurate and realistic animation.

The general system and method of the lip synchronization and synthesis system and method of the present invention having been described, the following paragraphs provide a more detailed description of the various components and modules of the system.

2.2 System Training

The following paragraphs provide the details of the training of the present lip synchronization system and method.

2.2.1. Signal Processing

Figure 3:
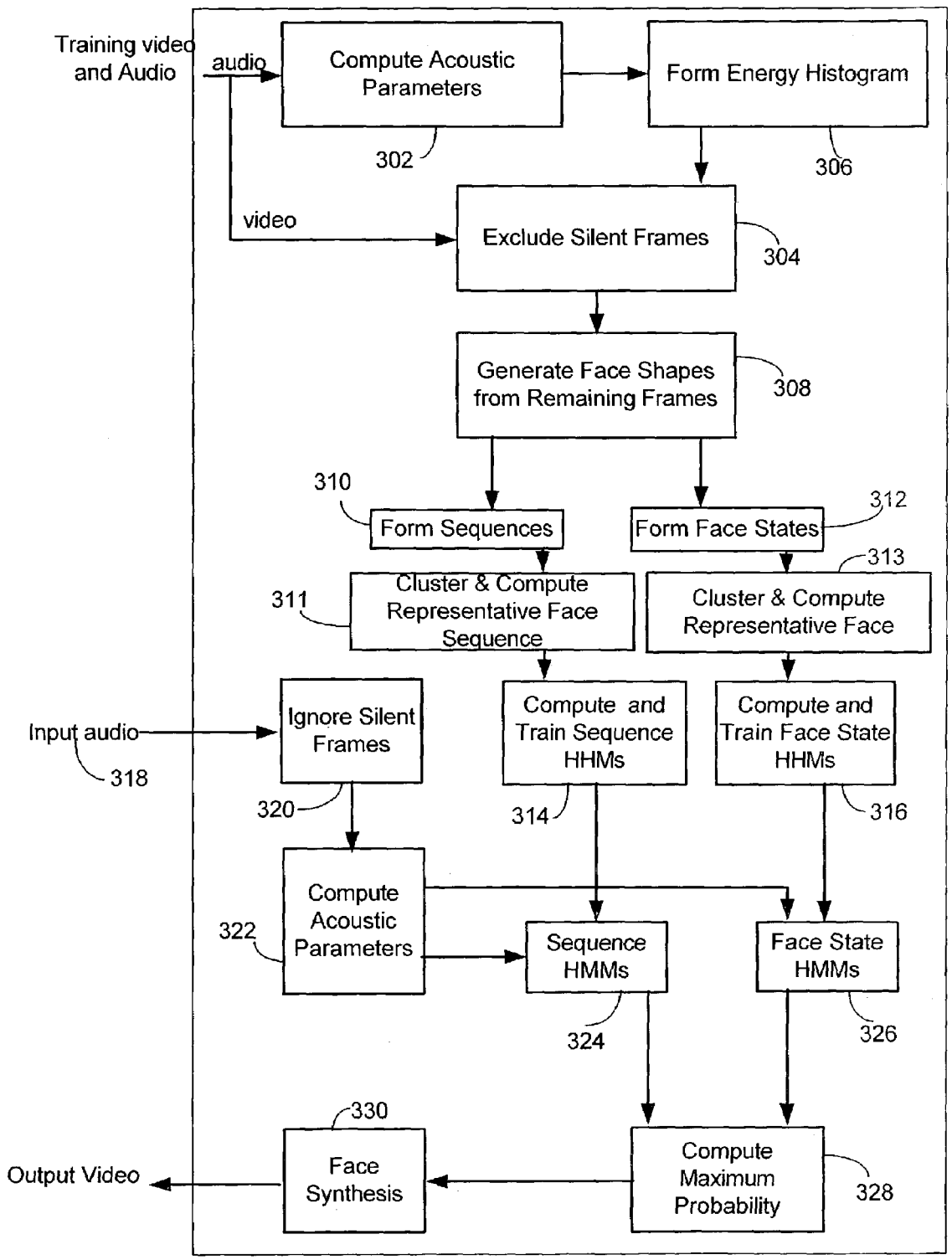
FIG. 3 is a flow chart depicting the overall process of both training the system and using it to synthesize lip motion.

Referring now to FIG. 3, a training video with synchronized audio is input into the system. In the training phase, to produce better continuity of the generated lip motion, sequences from a training video are utilized since consecutive frames naturally form a smooth progression. To obtain useful vocal data, Mel-Frequency Cepstrum Coefficients (MFCC) are calculated [14, 15] by conventional methods to generate acoustic parameters (process action 302). MFCC is a popular method for audio feature extraction that involves computation of a spectrum, sampling of the spectrum using a nonlinear frequency scale, and conversion of the spectrum into the cepstral domain. These Mel-Frequency Cepstrum coefficients are known to be useful for speech recognition and robust to variations among speakers and recording conditions.

In one working embodiment of the lip synchronization system and method, a PAL video sequence (25 fps) was used as training data. The audio sampling rate was 44100 Hz with 16-bit resolution. 12-dimensional MFCC coefficients and one energy parameter were calculated every 10 ms, and one image frame was mapped to four vocal frames.

2.2.2 Excluding Silent Frames

Sometimes people are accustomed to leaving their mouths open when they are not speaking, so silent (non-speaking) frames and voice frames are separated, or else the training result will be affected by this uncertainty. The silent frames are then excluded from further processing (process action 304). A simple method based on the energy of each frame is used to perform the task of separating silent and voice frames. An energy histogram of 80 seconds (or other prescribed length of time) of audio is first computed, as shown in process action 306. This histogram exhibits two peaks, one indicating the energy center of the silent frames and one indicating the energy center of the voice frames. The average of the two peaks is computed and used as a threshold to separate these types of frames, and only the voice frames are used for training and synthesis.

2.2.3 Obtaining Facial Data.

Figure 4A:
FIGS. 4A, 4B and 4C depict control points used to determine lip motion.
Figure 4B:
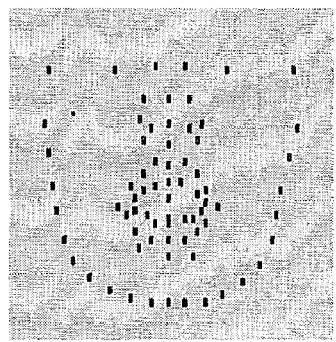
Figure 4C:
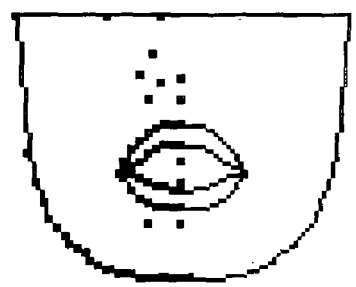

For each un-eliminated frame, a face shape is created, as shown in process action 308. In one working embodiment of the invention, to obtain facial data, an eigenpoints algorithm [16] is used to label the face and to identify the mouth and its shape, as shown in FIG. 4A. Then the control points are smoothed and symmetry is enforced in FIG. 4B. FIG. 4C displays the output points that show the shape of the mouth, nose and chin. These output points are used to model the facial data of a video frame associated with a person speaking and are referred to as face shapes herein after. The upper line marks the lower eyelids, which are assumed to be stationary during speech. It should be noted that other conventional ways of determining face shape could be used to generate face shapes.

2.2.4 Forming and Clustering Face States and Sequences.

Face sequences are then created from the remaining continuous chunks of non-silent video frames (process action 310). These sequences are broken into sub-sequences and are then clustered (i.e., similar sequences are identified) using a conventional clustering algorithm (process actions 311), such as a k-means clustering algorithm, based on the distance between both face shapes and acoustic vectors. Other clustering techniques could be used, however, such as interative partitioning. For each clustered sub-sequence, the centroid is computed as its representative sub-sequence.

Each of these clustered sub-sequence groups is used for training at least one sequence HMM. More particularly, for each sub-sequence, at least one HMM is created which is initialized using that sequence's acoustic feature vector sequence. These initial HMMs are formed using the segmental k-means algorithm [18] and are improved by additional training. The training of each HMM is done with the acoustic feature vectors (or parts thereof) associated with each of the sub-sequences making up the clustered sub-sequence group.

In addition to face sequences, face shape states are also created (process action 312), clustered (process action 313) and are used for HMM training using the same procedure as used for sequence HMMs. The reason for this is that differences in faces and viewing environments among the training videos may lead to errors in face shape estimation. Because of these differences, many face sequences in the videos will be unused in training sequence HMMs, and consequently, the acoustic data used for training will not include all voice sequences present in the training videos. If an input voice differs from those in the training sequences, some distortions may appear in the exported face sequence. To reduce this error, face states are considered as well as face sequences. Face states are representative face shapes clustered from a training video, and are handled like unit-length sequences. By introducing face states into the algorithm, a broader range of voice data is modeled because while many five-frame sequences from a training video are discarded, individual frames are all usable for face state HMMs. Training a HMM for each state using all training data gives a method for handling atypical acoustic data that may arise from unmodeled vocal sequences or unusual intonations. This training process is the same as that of sequence HMMs, such that the face shapes are clustered, a representative face shape is computed for each cluster, and the HMM is trained using the associated acoustic feature vectors.

The sequence length, the number of sequences and the number of face states are experimentally determined. There exists a tradeoff between speed and accuracy of the lip synthesis, so the sequence length, the number of sequences and the number of face states are adjusted to a desirable balance between accuracy and speed.

In one working embodiment of the invention, the face sequences were empirically chosen to be five frames in length, and their associated acoustic feature vector sequences were clustered from a training video to form 128 representative sequences. In this embodiment, the five frames of a face sequence comprised fifteen different sub-sequences: 1, 2, 3, 4, 5, 1-2, 2-3, 3-4, 4-5, 1-2-3, 2-3-4, 3-4-5, 1-2-3-4, 2-3-4-5 and 1-2-3-4-5.

Using the techniques mentioned above, in the working embodiment previously mentioned, 2000 face shapes and 8000 acoustic vectors were computed from 80 seconds of training video. After excluding all the frames labeled as silent, about 1500 short sequences were obtained, from which 128 clustered sequences were derived using a k-means clustering algorithm. Using fewer than 128 groups for clustering the system would provide a result more quickly, but with less accuracy. Likewise, if more than 128 groups were used for clustering, a more accurate result would be obtained, but at a cost of reduced speed. The output of the clustering process is a single representative sequence for each group, made up of five face shapes and their associated acoustic vectors (i.e. 20 acoustic vectors in all), where the representative face shapes are computed as the centroid of their corresponding clusters. The distance between two sequences for clustering purposes was composed of the distance between their face shapes and the distance between their acoustic vectors.

From each of these sequences, fifteen sub-sequences were generated and used for HMM training. In addition, sixteen face shape states were also clustered from all the face frames using a k-means clustering algorithm and were used for HMM training as well.

It is noted that the aforementioned MFCCs and energy parameter computed for each frame tend to vary with different recording conditions and people's speaking. To account for this variation, in one embodiment of the present invention, an average 12-D MFCC and energy parameter of the input training audio is calculated and subtracted from the like parameters computed for each frame to produce a normalized 13-D acoustic feature vector for each frame. Further, every normalized 13-D vector is expanded to a 27-D vector via conventional means [17] and is composed of five acoustic feature groups: Energy (E, $\Delta$E, $\Delta\Delta$E), MFCCs 1–5, MFCCs 6–12, $\Delta$MFCCs 1–6, (($\Delta$MFCCs 1–6. It is the 27-D acoustic feature group vector that is used for training the HMMs.

2.2.4 Hidden Markov Model Training

The state HMMs and sequence HMMs are trained separately (process actions 314 and 316). In general each HMM is trained to map acoustic feature vectors to their associated face shape or shapes in the form of the representative shapes computed. More particularly, in regard to training face state HMMs, they are trained using the Baum-Welch algorithm (or other suitable training algorithm) which maps acoustic feature vectors to their associated face state, where the acoustic feature vectors come from frames clustered into that face state group. The sequence HMMs associated with each of the aforementioned subsequences for each clustered sequence group are trained similarly, with the exception that all of the acoustic feature vectors associated with the frames in each subsequence in the clustered sequence group are used to train the HMM to map that representative sequence. In this way, the sequence HMMs covered a wider range of voices. For example in tested embodiments, the more than 600 face shapes in the sequences were enough to generate realistic animations.

In one embodiment of the present invention, rather than using the entire 5 group acoustic features associated with a frame in training a HMM, five HMMs. are created for each face state or sub-sequence using the five acoustic feature groups separately. Thus, as will be described in more detail next, in the synthesis stage, five probabilities are computed by a Viterbi algorithm, i.e., one from each HMM associated with a face state or sub-sequence. The product of the five values is the output probability of that face state or sub-sequence. In addition, it is noted that in tested embodiments of the present system and method, a left-right discrete HMM with four states is utilized. Further, the system associates an image frame to four vocal frames. Thus, four quantized vectors of the vocal frames are assigned to each video frame.

3.0 Synthesis

In the synthesis phase, the lip synchronization system and method of the invention computes vocal data from the input audio and exports face shapes selected by using a combination of face state HMMs and face sequence HMMs. In other words, the goal of the synthesis stage is to input audio and to generate lip sequences. In the most general sense, the probabilities that the input audio corresponds to the video frame sequence or face state associated with that HHM are computed for all HMMs. Then the maximum probability is selected, considering the path of the past video frame or frames that have been input, to identify an output face shape or sequence of face shapes. These output shapes are then used to synthesize output frames.

To accomplish this synthesis task, the input audio is processed the same way as the training data in that silent audio frames are ignored (process action 320) and the acoustic parameters are computed (process action 322). This includes an initializing procedure where a prescribed-length segment of the input audio (e.g., several seconds in a real-time embodiment or all the input audio in a non real-time embodiment) is captured and used to compute a silent frame/non-silent frame threshold in the manner described previously. In addition, the captured segment is used to compute average MFCCs and an energy parameter as described previously. The average MFCCs and energy component is subtracted from the input acoustic data before synthesis begins. This processed data is then input into the previously-trained sequence HMMs (process action 324) and the face state HMMs (process action 326), which then output the probabilities that the input audio corresponds to a video frame sequence or face state associated with that HMM (process action 328). The maximum probabilities are identified and used along with the path (the video frames that were previously identified) to decide which sequence or face state corresponds to the input audio signal.

More particularly, in the search for the face shape or face shape sequence that best matches the incoming acoustic vector stream, the probabilities of both the face state HMMs and face sequence HMMs are calculated by the Viterbi algorithm for each audio block (which was four 10 ms frames in a tested embodiment). The face state or face shape sequence that has the greatest probability is then exported and the lip movement is synthesized (process action 330). This synthesis can be accomplished as follows. A contour image of a head as the background is prepared, deleting the eyes, nose, lips and chin. With the assumption that eye movement is independent of lip movement while speaking, eye action is modeled as independent eye blinking and eyeball movement. Finally, the face shape or shapes corresponding to the selected face state or face shape sequence are combined with the eyes and facial contour and exported as a combined image.

The aforementioned maximum probability and the optimal face sequence can be calculated by various means. One method of determining this is by a function Process Path, that is described in detail in Appendix A. The Process Path algorithm assists in selecting a face shape or a sequence of face shapes given one or more blocks of preprocessed audio input.

Figure 7A:
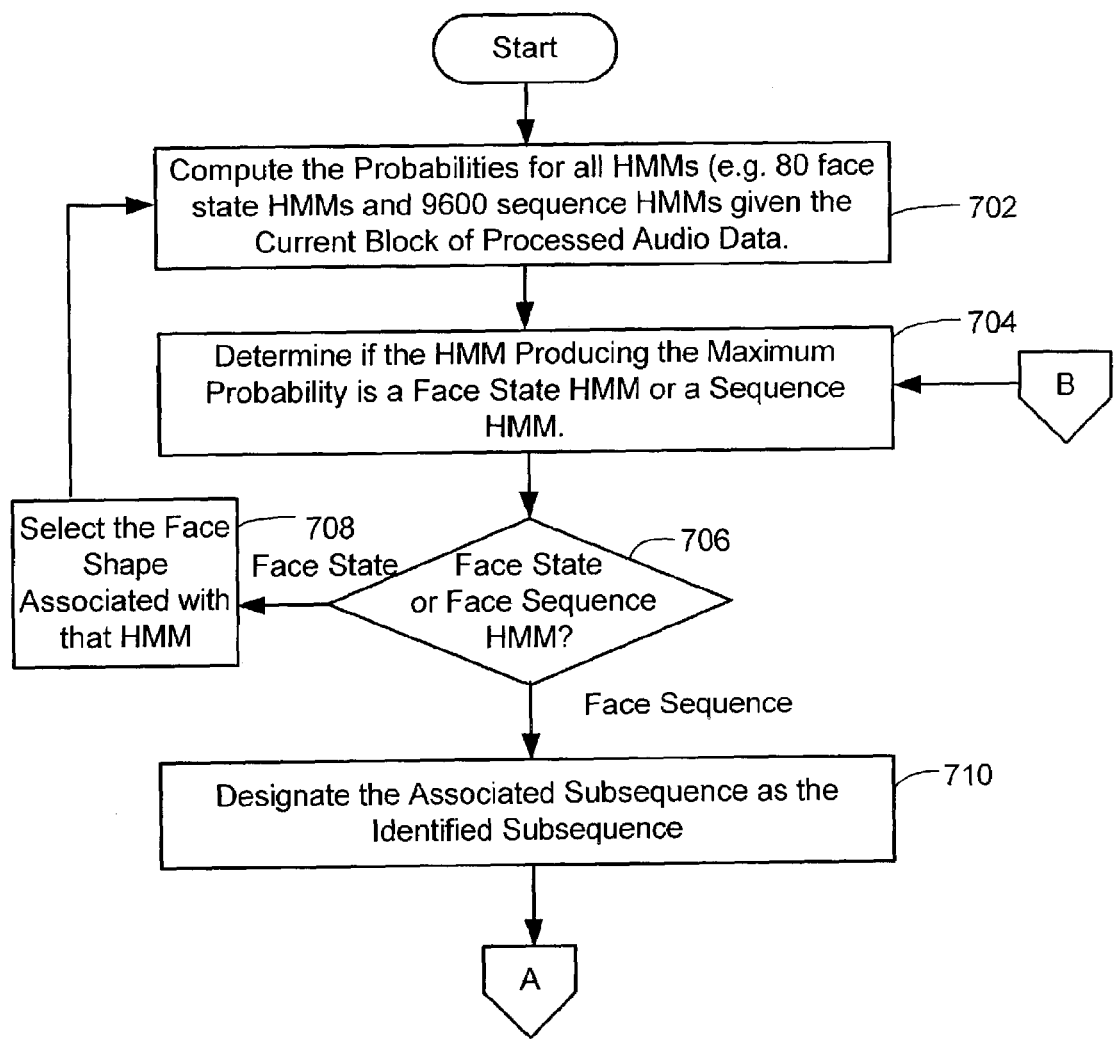
FIGS. 7A and 7B provide a flowchart of the Process Path function employed by the lip synchronization system and method of the invention.
Figure 7B:
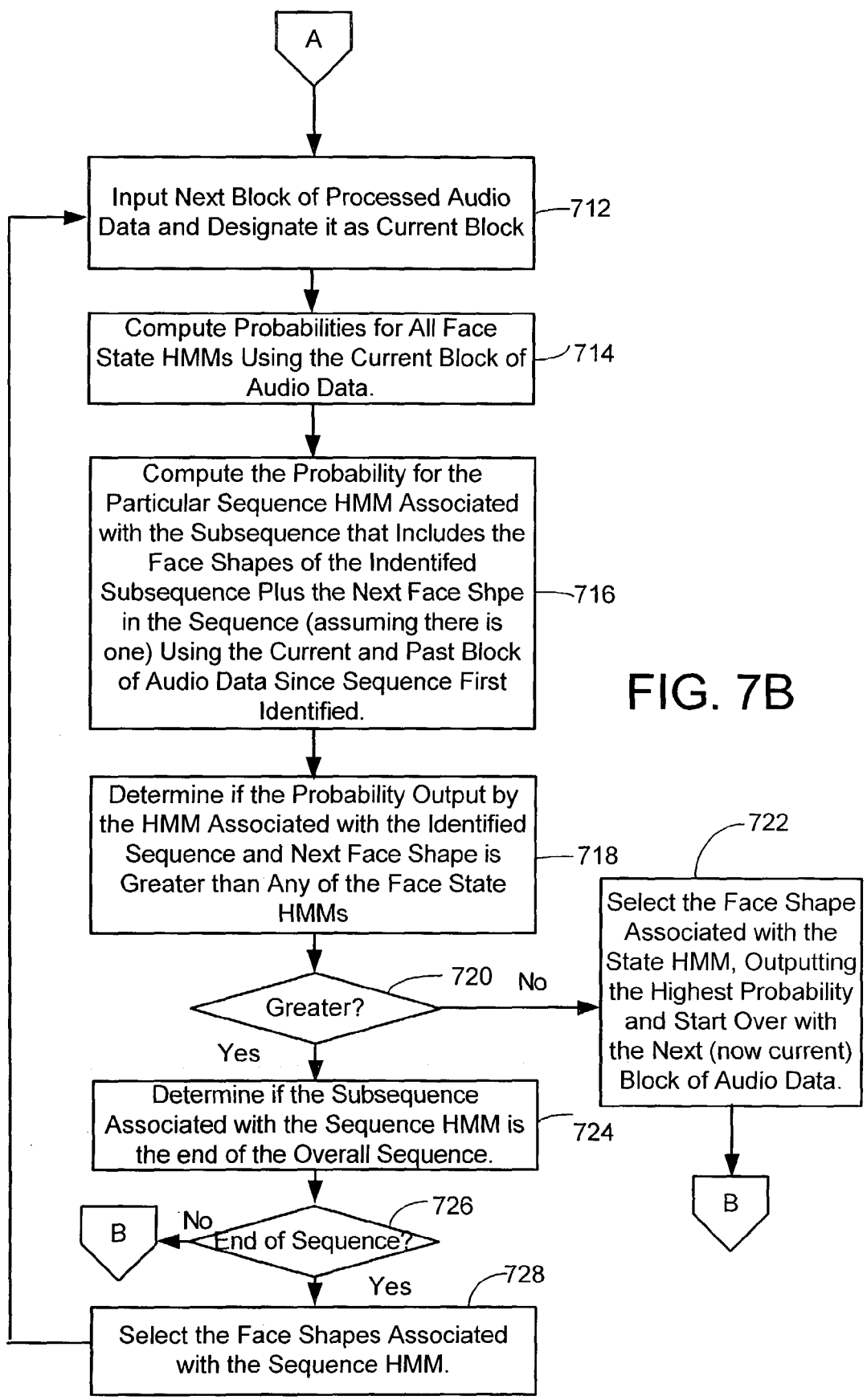

Referring now to FIGS. 7A and 7B, the process path procedure generally involves first computing probabilities for all HMMs given a current block of processed audio data (process action 702). Then, as shown in process actions 704, 706, it is determined if the HMM producing the maximum probability is a face state HMM or a sequence HMM. If the HMM is a face state HMM, the face shape associated with that HMM is selected and the processing starts over at process action 702 with the next block of audio data.

If the HMM is a face sequence HMM, the associated sequence is designated as the "identified subsequence" (process action 710). The next block of processed audio data is then input and designated as the current block (process action 712). Probabilities for all face state HMMs are computed using the current block of audio data (process action 714). The probability for the particular sequence HMM associated with a subsequence that includes the face shapes of the identified subsequence plus the next face shape in the sequence (assuming there is one, as should be the case) is computed (process action 716) using the current and past blocks of audio data since the sequence was first identified. For example, if the identified sequence was a 3-shape sequence, then find the HMM that has the next face shape in the sequence—If 1-2-3 find 1-2-3-4, if 2-3-4 find 2-3-4-5. Next it is determined if the probability output by the HMM associated with the "identified sequence and next face shape" is greater than any of the face state HMMs (process action 718). If it is not greater, the face shape associated with the face state HMM outputting the highest probability is selected and the process starts over at process action 702 (process actions 720–722). If it is greater, it is determined if the subsequent face shape associated with the sequence HMM is the end of the overall sequence (e.g., 3-4-5) (process actions 720–724). If so, the face shapes associated with the sequence HMM are selected and the process starts over at process action 702 (process action 726). If not, as shown in process action 728, the process is repeated starting at process action 712.

It is noted that if the embodiment where an HMM is training for each group of an overall acoustic feature vector is employed, the foregoing procedure is the same except that the probabilities used to determine the maximum probability is the product of the probabilities output by the 5 HMMs associated with a particular face state or subsequence.

4.0 Results.

In this section, experimental results for both non-real-time and real-time face synthesis are provided. In one working embodiment of the invention, 9600 HMMs for the face sequences (5 acoustic features×15 subsequences per face sequence×128 face sequences) and 80 HMMs for the face states (5 acoustic features×16 face states) were used. The input to each subsequence HMM was four 10 ms vocal frames for each subsequence element, and to each face state HMM was four 10 ms vocal frames. The output for each face subsequence or face state was the product of the five probabilities given by its five HMMs. The system output was the face shape of the subsequence or state that has the highest probability.

4.1. Non-real-time Face Synthesis

Eleven segments of videos that were about 80 seconds long were recorded. The face states and sequences were then clustered from the segment with the best tracking of face points by the eigenpoint technique. After initialization of the face state HMMs and face sequence HMMs using the representative face shapes and the segmental k-means algorithm, they were trained using 20000 face shapes and 80000 acoustic feature vectors extracted from ten segments of videos. The remaining segments were then used to test the algorithm. Video discontinuities were found to occur between consecutive frames in the following instances: one was a silent frame and the other was a voice frame, both were associated with face shape states, one came from a face shape state and the other from a face sequence, and each was from a different sequence.

It is also noted that if the foregoing procedure is limited to sequence of just one face shape, the synthesis process becomes real-time with a face shape being output for every block of audio data input (assuming 40 ms blocks and a frame rate of approximately 25 fps), albeit with some loss in accuracy and continuity.

To reduce the magnitude of discontinuities, both previous and subsequent faces were used to smooth the current face by a conventional coefficient averaging procedure. On the other hand, closed mouths had to be protected from being smoothed when plosions (/b/, /p/) were pronounced. Therefore, coefficients were appropriately adjusted in different cases to find a best match between the original and synthesized faces.

Figure 5A:
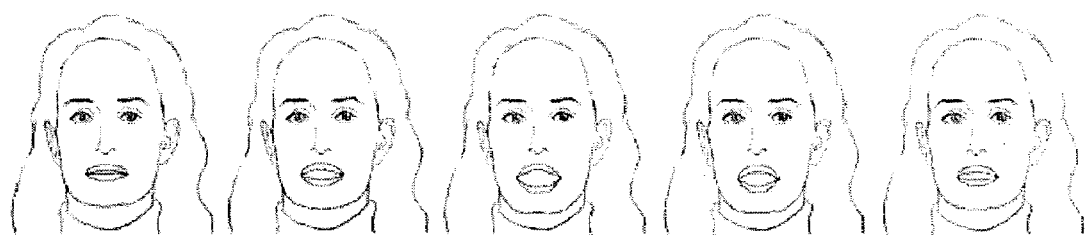
FIGS. 5A and 5B show to examples of a synthesized face sequences. Two contour images are prepared as the background and combined with the lip motion result.
Figure 5B:
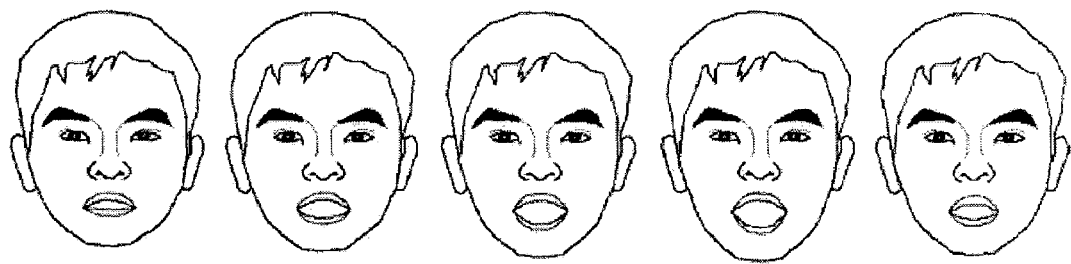
Figure 6A:
FIGS. 6A, 6B and 6C shown a graph of synthesized lip height compared to original lip height.
Figure 6B:
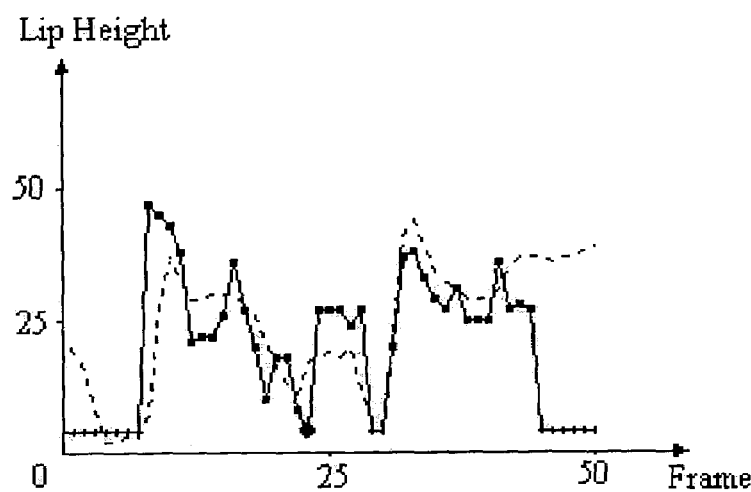
Figure 6C:
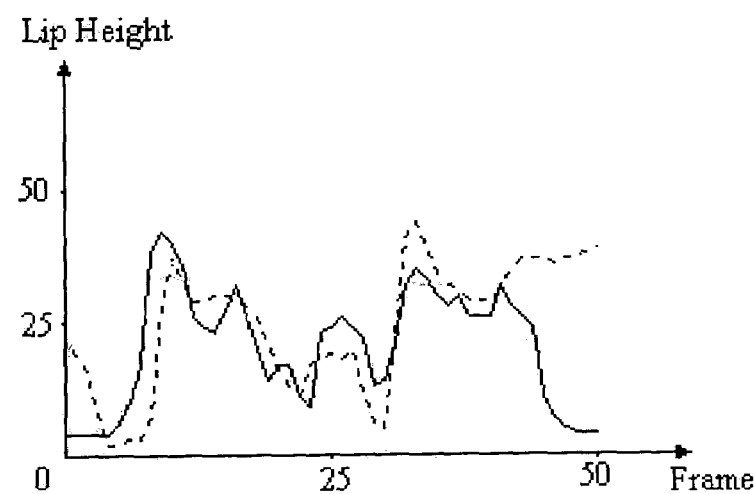

Two examples of synthesized output frames are given in FIGS. 5A and 5B. In FIGS. 6A, 6B and 6C, the lip heights of the synthesized faces were compared with the original ones when the system input several seconds of a person's voice. The slopes of the two curves were similar in most cases. At the same time, the curve matched the input sound wave and phonemes accurately. Although the two curves still had great differences in some cases, most of these cases occurred in low energy frames such as silent frames (points a, b, c).

In FIG. 6B, three types of symbols indicate the model that was used to synthesize the face shape of a frame. Except for the silent frames, most sound frames were synthesized by the sequence HMMs. Although only a few frames were synthesized by the state HMMs, the face state HMMs were necessary for two reasons. First, the state HMMs were trained from all kinds of voices, while the sequence HMMs were trained only from videos in which the face shape sequences were similar to one of the clustered sequences. Since the state HMMs modeled a broader range of voices, they were needed when the input voice was much different from those used to train the sequence HMMs, such as at point d. Second, as described in the function ProcessPath, the maximal probability returned by the state HMMs served as a standard value to judge whether the face shape synthesized by the sequence HMMs was accurate or not.

Different people were invited to try the lip synchronization system. The synthesized result matched their voice accurately, and the animations seemed very realistic. Although the system was trained using the English voice of a woman, the system can adapt to different kinds of languages, including Chinese. Other sounds such as laughs and catcalls can also drive the system.

4.2 Real-time Face Synthesis

Using the same model and the test video as in Section 4.1, the real-time capabilities of the present system and method were tested. In real-time synthesis, only previously seen faces were used to smooth the current face. The coefficients for different cases were also adjusted to find the best match between the original and synthesized faces. In this way not only were continuous animations obtained, but closed mouths were also protected from being smoothed when plosions were pronounced.

With the audio used in FIG. 6, it was found that although there is a slightly greater difference between the lip heights of the synthesized faces and the original lip heights, the result matched the input audio well.

The synthesis time for each 40 ms speech segment was less than 22 ms on a 733 MHz Pentium PC. Therefore, people could not detect any delay between input audio and synthesized video. Although the lip synchronization system and method of the invention was tested with 2D faces, the method is also adaptable to 3D and image-based faces.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

APPENDIX A

In one working embodiment of the invention, the face sequence of each level path is calculated by the function ProcessPath. This function and its variables are as follows:

PrevS: the previous face sequence number.
PrevT: If PrevS is −1, it is the previous face state number. Otherwise, it is the previous face shape number of the sequence. If PrevT is −1, the previous frame is silent.
S: the current face sequence number.
T: If S is −1, it is the current previous face state number. Otherwise, it is the current face shape number of the sequence.
n; the current line number.
N: the total number of lines in the path.
P: the maximal probability of the path
StateP: the maximal probability of the face states
StateN: the face state that has the maximal probability
Seq P: the maximal probability of the sub-sequences
L: the length of the current line

```
function ProcessPath( )
PrevS ← −1
PrevT ← −1
P     ← 1
    FOR n = 1 To N DO
    {
    Calculate the probabilities of the 16 face states
    StateP ← the maximal probability
    StateN ← the optimal face state
    IF PrevS ≠ −1 THEN
    {
      SeqP ← the probability of the sub-sequence
        (PrevT+1) − (PrevT+2)− ··· −(PrevT+L)
        of the sequence PrevS
      IF SeqP ≥ StateP THEN
      {
        T ← PrevT + L
        S ← PrevS
        P ← P* SeqP
        GOTO Jump
      }
    }
    Calculate the probabilities of the sub-sequence
        1 − 2 − ··· −L
      of the 128 sequences
    SeqP ← the maximal probability
    S    ← the optimal sequence
    IF SeqP ≥ StateP THEN
    { T ← L
      P ← P* SeqP
      GOTO Jump }
    S ← −1
    T ← StateN [Export the best face state]
    P ← P* StateP
    Jump:
      PrevS ← T
      PrevT ← S
    }
    RETURN P
```

Sometimes sound frame segments are very long, causing the lip synchronization system and method to search a large number of paths. To improve the efficiency, the level number of the structure can be limited to 10 and long segments can be divided into short parts. The initial values of PrevS and PrevT are set as the last values of the previous part.

If the search range and the maximal level of the level building structure are set to 1, the method can be used in real-time face synthesis applications. Before performing real-time synthesis, however, some initialization is first performed. The system asks the user to input several seconds of voice audio, from which an energy histogram is formed and an energy threshold is computed. In the real-time synthesis phase, if the energy of the input frame is less than this threshold, it is considered as a silent frame, and a face shape with a closed mouth is assigned to it. Also the average MFCC coefficients and the energy parameter of the initialization voice are calculated and they are subtracted from the input acoustic data before synthesis. Then the function ProcessPath is used to synthesis the face shape. Each time 40 ms of input voice is processed and only one face shape is obtained. The values of S and T of the previous frame are also used to calculate the current S and T.

REFERENCES

[1] S. Morishima and H. Harashima, "A media conversion from speech to facial image for intelligent man-machine interface", *IEEE Journal on Selected Area in Communications*, 9(4), 1991.

[2] S. Curinga, F. Lavagetto, and F. Vignoli, "Lip movement synthesis using time delay neural networks", *Proc. EUSIPCO96*, 1996.

[3] F. Lavagetto, "Converting speech into lip movements: a multimedia telephone for hard of hearing people", *IEEE Transactions on Rehabilitation Engineering*, Vol. 3, No. 1, 1995, pp. 90–102.

[4] S. Curinga, R. Pockaj, F. Vignoli, C. Braccini, and F. Lavagetto, "Application of Synthetic Lip Motion to Hybrid Video Coding", Int. Workshop on "*Synthetic—Natural Hybrid Coding and 3D Imaging*" (IWSNHC3DI'97), Sep. 5–9, 1997, Rodhes, pp. 187–191.

[5] R. Rao and T. Chen, "Using HMM's for audio-to-visual conversion", *IEEE '97 Workshop on Multimedia Signal Processing*, 1997.

[6] M. Brand, "Voice Puppetry", *Proc. ACM SIGGRAPH'99*, 1999.

[7] E. Yamanoto, S. Nakamura, and K. Shikano, "Lip movement synthesis from speech based on hidden Markov models", *Proc. Int. Conf. On automatic face and gesture recognition*, FG '98, pages 154–159, Nara, Japan, 1998. IEEE Computer Society.

[8] S. Kshirsagar, and N. Magnenat-Thalmann, "Lip synchronization using linear predictive analysis", *Proceedings of IEEE International Conference on Multimedia and Expo*, New York, August 2000.

[9] C. Bregler, M. Covell, and M. Slaney, "Video Rewrite: Driving visual speech with audio", *Proc. ACM SIGGRAPH '97*, 1997.

[10] B. LE Goff, T. Guiard-marigny, M. Cohen, and C. Benoit, "Real-time analysis-synthesis and intelligibility of talking faces", *2nd International Conference on Speech Synthesis*, Newark(N.Y.), September 1994.

[11] Fu Jie Huang, and Tsuhan Chen, "Real-time lip-synch face animation driven by human voice", *IEEE Multimedia Signal Processing Workshop*, Los Angeles, Calif., 1998.

[12] S. Morishima, "Real-time talking head driven by voice and its application to communication and entertainment", *Proc. AVSP 98, International Conference on Auditory-Visual Speech Processing*.

[13] L. Rabiner, "A tutorial on hidden Markov models and selected applications in speech recognition", *Proceedings of the IEEE*, 1989,77(2):257–286.

[14] S. B. Davis, and P. Mermelstein, "Comparison of parametric representations for monosyllabic word recognition in continuously spoken sentences", *IEEE Transactions on Acoustics, Speech and Signal Processing*, ASSP-28:357–366, August 1980.

[15] J. Picone, "Signal Modeling Techniques in Speech Recognition", *Proceedings of the IEEE*, 1993.

[16] M. Covell, and C. Bregler, "Eigenpoints", *Proc. Int. Conf. Image Processing*, Lausanne, Switzerland, Col. 3, pp. 471–474, 1996.

[17] Eric Chang, Jianlai Zhou, Shuo Di, Chao Huang, and Kai-Fu Lee, "Large vocabulary Mandarin speech recognition with different approaches in modeling tones", *International Conference on Spoken Language Processing*, Beijing, Oct. 16–20, 2000.

[18] L. R. Rabiner, J. G. Wilpon, and B. H. Juang, "A segmental k-means training procedure for connected work recognition based on whole word reference patterns", *AT&T Tech. J.*, vol. 65, no. 3, pp. 21–31, May/June 1986.

[19] L. R. Rabiner, J. G. Wilpon, and F. K. Soong, "High Performance Connected Digit Recognition Using Hidden Markov Models", *IEEE Transaction on Acoustics, Speech and Signal Processing*, vol. 37, no. 8, August 1989.

Wherefore, what is claimed is:

1. A computer-implemented process for synthesizing mouth motion to an audio signal, comprising the following process actions:
   training Hidden Markov Models using substantially continuous images of face sequences correlated with a speech audio signal wherein said training comprises:
      inputting a training video comprising both video and audio data,
      quantizing facial and vocal data from said video and audio data,
      excluding silent audio frames corresponding to video frames from further processing, wherein the process action of excluding silent frames comprises the process actions of:
         generating an energy histogram of each frame in a prescribed length of audio data, which results in two peaks, the first peak indicating the energy center of the silent frames, the second peak indicating the energy center of the voice frames;
         computing the average of the first and second peaks;
         using the average of the two peaks as a threshold to separate the audio frames into voice and silent frames,
      creating face states and face sequences from said facial and vocal data, and
      training Hidden Markov Models corresponding to said face states and said face sequences; and
   using said trained Hidden Markov Models to generate mouth motions for a given audio input.

2. The computer-implemented process of claim 1 wherein the process action of quantizing facial data comprises the process action of creating a face shape.

3. The computer-implemented process of claim 2 wherein the process action of quantizing facial data comprises the process action of:
   labeling the face and identifying the mouth and its shape with control points via an eigenpoints algorithm.

4. A computer-implemented process for synthesizing mouth motion to an audio signal, comprising the following process actions:
   training Hidden Markov Models using substantially continuous images of face sequences correlated with a speech audio signal, wherein said training comprises:
      inputting a training video comprising both video and audio data,
      quantizing facial and vocal data from said video and audio data,
      creating face states and face sequences from said facial and vocal data wherein creating face sequences comprises,
         creating sequences of faces from said facial data,
         breaking said sequences of faces into subsequences,
         clustering said subsequences into similar sequences of faces, and
      training Hidden Markov Models corresponding to said face states and said face sequences; and
   using said trained Hidden Markov Models to generate mouth motions for a given audio input.

5. The computer-implemented process of claim 4 wherein said clustering process action employs a k-means clustering algorithm based on the distance between face shapes and acoustic vectors obtained from said acoustic analysis.

6. The computer-implemented process of claim 4 wherein said clustering process action employs an iterative partitioning technique.

7. The computer-implemented process of claim 4 further comprising the process action of computing the centroid for each clustered sub-sequence as its representative sub-sequence.

8. The computer-implemented process of claim 4 wherein creating face states comprises the process actions of:
    creating a face state from each frame of said facial data; and
    clustering said face states into groupings of similar facial data.

9. A computer-implemented process for synthesizing mouth motion to an audio signal, comprising the following process actions:
    training Hidden Markov Models using substantially continuous images of face sequences correlated with a speech audio signal, wherein said training comprises:
        inputting a training video comprising both video and audio data,
        quantizing facial and vocal data from said video and audio data,
        creating face states and face sequences from said facial and vocal data, and
        training Hidden Markov Models corresponding to said face states and said face sequences, wherein training said Hidden Markov Model corresponding to said face sequences comprises:
            searching said training video to locate face sequences whose face shapes, defined by feature points, are similar to the face shapes of the given sequence; and
            using the acoustic data corresponding to the located face sequences to train said Hidden Markov; and
    using said trained Hidden Markov Models to generate mouth motions for a given audio input.

10. The computer-implemented process of claim 4 wherein training said Hidden Markov Model corresponding to said face sequences comprises:
    initializing at least one HMM corresponding to a given face sequence using said face sequences acoustic vector sequence; and
    improving said at least one initialized HMM through training with acoustic feature vector portions associated with each of the subsequences making up the clustered subsequence group.

11. The computer-implemented process of claim 4 wherein the process action for generating mouth motions comprises:
    inputting an audio signal;
    computing vocal data via acoustic analysis from said input audio; and
    exporting face shapes selected by using a combination of trained face state HMMs and face sequence HMMs.

12. A computer-implemented process for synthesizing mouth motion to an audio signal, comprising the following process actions:
    training Hidden Markov Models using substantially continuous images of face sequences correlated with a speech audio signal; and
    using said trained Hidden Markov Models to generate mouth motions for a given audio input, wherein the process action for generating mouth motions comprises:
    inputting an audio signal;
    computing vocal data via acoustic analysis from said input audio; and
    exporting face shapes selected by using a combination of trained face state HMMs and face seguence HMMs wherein the face shapes are selected by using a combination of trained face state HMMs and face sequence HMMs comprises the following process actions:
    (a) computing the probabilities for all face state HMMs and face sequence HMMs given a current block of processed audio data;
    (b) determining if the HMM producing the maximum probability is a face state HMM or a face sequence HMM;
    (c) if the HMM producing the maximum probability is a face state HMM, selecting the face shape associated with that HMM and returning to process action (a);
    (d) if the HMM producing the maximum probability is a face sequence HMM, designating the associated subsequence as the identified subsequence;
    (e) inputting the next block of processed audio data and designate it as the current block;
    (f) computing probabilities for all face state HMMs using the current block of audio data;
    (g) computing probabilities for the particular sequence HMM associated with the subsequence that includes the face shapes of the identified subsequence (assuming there is one) using the current and past block of audio data since the sequence was first identified;
    (h) determining if the probability output by the HMM associated with the identified sequence and next face shape is greater than any of the face state HMMs;
    (i) if the probability output by the HMM associated with the identified sequence and next face shape is greater than any of the face state HMMs, determining if the subsequence associated with the sequence HMM is the end of the overall sequence;
    (j) if the subsequence associated with the sequence HMM is the end of the overall sequence, select the face shapes associated with the sequence HMM and return to process action (e); and
    (k) if the subsequence associated with the sequence HMM and the next face face shape is not greater than any of the face state HMMs and the end of the overall sequence, selecting the face shape associated with the face state HMM, outputting the highest probability, and going to process action (b) to process the next block of audio data.

13. The computer-implemented process of claim 12 wherein the process action of computing vocal data via acoustic analysis from said input audio comprises employing Mel-Frequency Cepstrum Coefficients (MFCC).

14. A system for synthesizing lip motion to coordinate with an audio input, the system comprising:
    a general purpose computing device; and
    a computer program comprising program modules executable by the computing device, wherein the computing device is directed by the program modules of the computer program to,
    train Hidden Markov Models using images of face sequences associated with an audio signal, wherein the program module for training Hidden Markov Models comprises program sub-modules for:
    inputting a correlated audio and video signal of a person speaking;
    computing acoustic parameters of the audio signal;
    forming an energy histogram for each frame of acoustic data;
    excluding silent frames of acoustic data using said energy histogram, wherein said sub-module for excluding silent frames of acoustic data using said energy histogram comprises a sub-module for:
generating an energy histogram of each frame in a prescribed length of audio data, which results in two peaks, the first peak indicating the energy center of the silent frames, the second peak indicating the energy center of the voice frames;
computing the average of the first and second peaks;
using the average of the two peaks as a threshold to separate the audio frames into voice and silent frames;
generating face shapes corresponding to audio frames not excluded as silent frames;
forming face sequences;
forming face states;
computing and training face sequence Hidden Markov Models; and
computing and training face state Hidden Markov Models; and
use said trained Hidden Markov Models to synthesize images of mouth motions for a given audio input.

15. The system of claim 14 wherein the sub-module for generating face shapes comprises sub-modules for:
identifying the features of the face with control points.

16. The system of claim 14 wherein the program module for forming face sequences comprises sub-modules for:
creating sequences of faces from said facial data;
breaking said sequences of faces into subsequences;
clustering said subsequences into similar sequences of faces.

17. The system of claim 16 wherein said clustering sub-module employs a k-means clustering algorithm.

18. The system of claim 14 wherein said sub-module for forming face states comprises sub-modules for:
creating a face state from each frame of said facial data; and
clustering said face states into groupings of similar facial data.

19. The system of claim 14 wherein the program module for using said trained Hidden Markov Models to synthesize images of mouth motions for a given audio input comprises sub-modules for:
inputting an audio signal;
computing vocal data via acoustic analysis from said input audio; and
exporting face shapes selected by using a combination of trained face state HMMs and face sequence HMMs.

20. A computer-implemented process for synthesizing a video from an audio signal, comprising the following process actions:
inputting a training video of synchronized audio and video frames;
training a series of Hidden Markov Models, each of which represents one of a sequence of consecutive characterized video frames of a face of a person speaking or a single characterized video frame of a face of a speaking person, with characterized segments of a portion of the audio associated with the particular frame sequence or frame represented by the HMM, such that given an audio input each HMM is capable of providing an indication of the probability that a portion of the audio input matches the portion of the audio of the training video used to train that HMM, wherein synchronized silent audio and video frames are excluded by:
computing an energy histogram for a set of frames over a prescribed period of time, said histogram exhibiting a first and second peak wherein said first peak indicates the energy center of the silent frames, and the second frame indicates the energy center of the voice frames;
averaging the first peak and the second peak;
using said average to define a threshold to separate the silent and speaking frames; and
using only said voice frames for said training and synthesizing process actions;
consecutively inputting portions of an audio signal of a person's voice into each trained HMM and identifying from the resulting HMM probability produced for each portion of the input audio a characterized frame or sequence of characterized frames best matching the inputted portion of the audio signal; and
synthesizing a video sequence from the characterized frames identified as best matching the inputted audio portions and generating frames of the synthesized video by synchronizing the synthesized video sequence with associated portions of the input audio.

21. The computer-implemented process of claim 20 wherein said characterized segments the audio are characterized by generating acoustic parameters using Mel-Frequency Cepstrum Coefficients.

22. The computer-implemented process of claim 20 wherein said prescribed time period is 80 msec.

23. The computer-implemented process of claim 20 wherein the characterized video frames are characterized by creating a face shape.

24. The computer-implemented process of claim 23 wherein control points are used to model the shape of features of the face.

25. The computer-implemented process of claim 23 wherein an eigenpoints algorithm is used to label the features of the face.

26. The computer-implemented process of claim 20 wherein said training process action further comprises:
for said sequence of consecutive characterized video frames,
clustering said face shapes of said sequence;
computing a representative face subsequence for each cluster; and
training said series of Hidden Markov Model using associated acoustic feature vectors;
for said video frames of a face of a person speaking,
clustering said face shapes;
computing a representative face shape for each cluster; and
training said series of Hidden Markov Model using associated acoustic feature vectors.

* * * * *